(No Model.)  2 Sheets—Sheet 2.

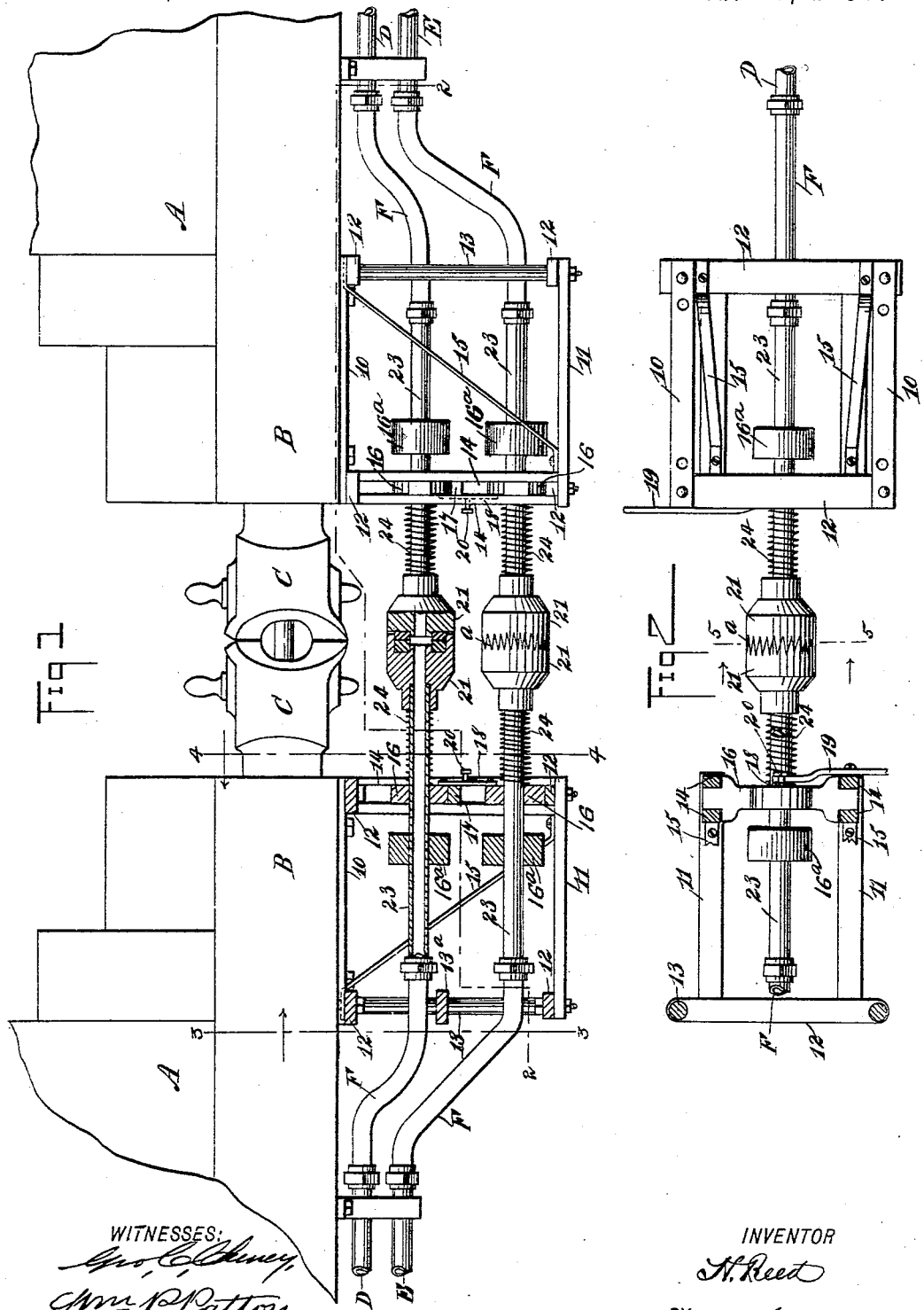

H. REED.
AUTOMATIC PIPE CONNECTION.

No. 555,333. Patented Feb. 25, 1896.

WITNESSES:

INVENTOR
H. Reed
BY Munn & Co
ATTORNEYS.

UNITED STATES PATENT OFFICE.

HARRISON REED, OF LOGANSPORT, INDIANA.

AUTOMATIC PIPE CONNECTION.

SPECIFICATION forming part of Letters Patent No. 555,333, dated February 25, 1896.

Application filed July 15, 1895. Serial No. 556,054. (No model.)

*To all whom it may concern:*

Be it known that I, HARRISON REED, of Logansport, in the county of Cass and State of Indiana, have invented a new and Improved Automatic Pipe Connection, of which the following is a full, clear, and exact description.

This invention relates to improvements in automatic pipe-couplings, and particularly to such as are employed for the automatic connection of steam and air conducting pipes on the cars of a train, used for supplying air-brakes, steam-heating and other purposes.

The objects of my invention are to provide novel, simple, and effective pipe-couplings of the indicated type, which may be readily adjusted to compensate for varying heights of car-bodies from the track, and thus insure a reliable connection of pipe-sections on cars that form a train, and, furthermore, that will be adapted for automatic disconnection when the cars of a train are disconnected.

The invention consists in the construction and combination of parts, as hereinafter described and indicated in the claims.

Reference is to be had to the accompanying drawings, forming a part of this specification, in which similar characters of reference indicate corresponding parts in all the views.

Figure 3:
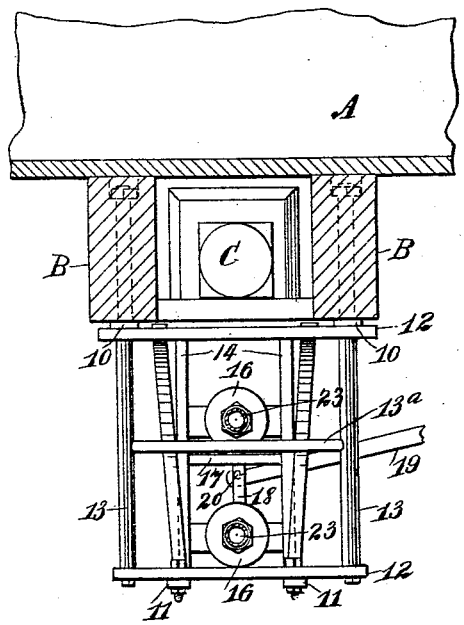
Figure 4:
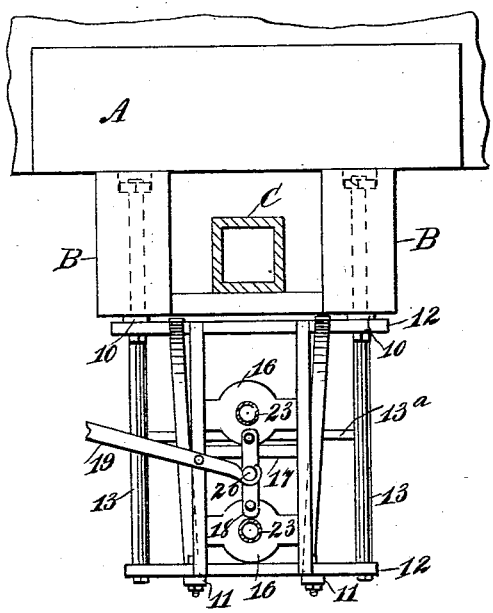
Figure 5:
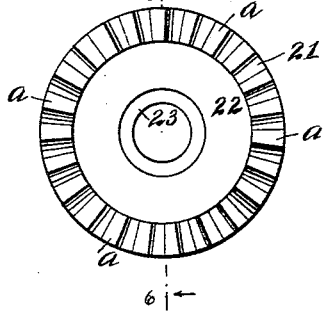
Figure 6:
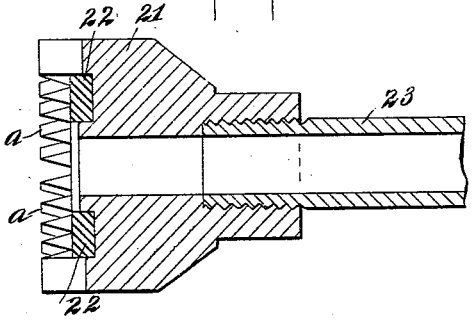

Figure 1 is a partly-sectional side view of the improvements shown in coupled connection joining steam and air pipes shown in part on the ends of two coupled cars. Fig. 2 is a partly-sectional plan view of the improvements, substantially on the line 2 2 in Fig. 1. Fig. 3 is a transverse sectional view substantially on the line 3 3 in Fig. 1. Fig. 4 is a transverse sectional view substantially on the line 4 4 in Fig. 1. Fig. 5 is an enlarged end view of one of the pipe-coupling heads, its position being indicated by the line 5 5 and the arrows in Fig. 2; and Fig. 6 is a longitudinal sectional view of one of the coupling-heads and a portion of a supporting-pipe section, substantially on the line 6 6 in Fig. 5.

The improved pipe-coupling devices are applicable to railroad-cars for either freight or passenger service, occupying positions below and near the car-couplings, that may be of any construction; and the said pipe-couplings by their peculiar construction are adapted to join together steam and air conduit-pipes when cars having the improvements are coupled together as a train by the usual car-couplings.

Referring to the drawings, A A represent the ends of two cars, of which B B are parts, being longitudinal stringers or frame-timbers spaced apart and located in pairs near the transverse center of the frame of each car. The car-couplings C are, as usual, placed between the timbers B of each car, as shown in Fig. 1, and as the improved pipe-coupling devices on the cars that form the train are similar in construction, a description of one will answer for a pair that are to connect steam and air pipes on two connected cars.

A light strong hanger-frame is provided for the support of the pipe-couplings on each car, the said frame essentially comprising two cap-pieces 10, two sill-plates 11, four cross-pieces 12, that in pairs are lapped by their ends on the ends of the pieces 10 11, and are thereto secured by any preferred means, thus affording top and bottom portions of the hanger-frame.

The described parts of the hanger-frame are held spaced apart at their rear ends by two upright posts 13, that are secured by their ends to the same at or near their corners, and between the front cross-bars 12 of the upper and lower frame portions two vertical standards 14 are introduced at each side of the hanger-frame, and are firmly affixed to said cross-bars. A cross-brace 13ª may be introduced between the posts 13 to stiffen the frame.

The two pairs of standards 14 are similarly spaced apart and the members of each pair are rendered parallel.

Preferably the hanger-frame is strengthened by the diagonal braces 15 that extend from the upper section of the frame to the lower part of the same and are secured by their ends thereto.

A pair of rectangular hanger-frames, such as described, is furnished for each car and secured in place thereon by a bolted attachment of one hanger-frame at each end of the car directly below the car-couplings C, so as to maintain the pipe-couplings in proper relative position for coupled engagement when the car-couplings on two adjacent cars are coupled together.

Two cross-heads 16 are provided for each hanger-frame, each cross-head consisting of a block having lateral projections that are adapted to slide between the pairs of standards 14, entering the spaces between them, so that the cross-heads are loosely secured between the standards that compose housings for the cross-heads 16 and permit them to receive vertical adjustment. Each pipe 21 is provided with a collar 16ᵃ, which serves to limit the outward movement of the pipes.

The upper cross-head is separated from the lower cross-head by a transverse supporting-bar 17, which is secured at its ends between the paired standards 14 at a point near their vertical centers, so that the upper cross-head may rest on said cross-bar, as shown in Fig. 4.

The cross-heads 16 are suitably spaced apart by a link-plate 18 pivoted at its ends thereon, and as it is essential for the proper operation of the improved pipe-couplings that the cross-heads be adapted for vertical adjustment by an operator at the side of the car a lever 19 is furnished and is pivoted on one of the standards 14, the inner end of the lever having a hook formed on it or being otherwise constructed to adapt it for a loose engagement with a projecting pin 20, secured on the link-plate between its ends. The length of the lever 19 should be sufficient to project it toward the side of the car within easy reach of a trainman.

The two coupling-head sections furnished to automatically connect the two ends of a tubular conduit are shown at 21 in the drawings, and are twin sections, each consisting of a cylindrical block having its coupling end concentrically recessed to receive a preferably elastic joint-ring 22 and having produced on the annular end face a series of V-shaped grooves, thus affording a corresponding series of spaced V-shaped projections or teeth $a$, adapted to engage with the notches or grooves in a mating coupling-head section.

The coupling-sections 21 are axially perforated, and at their ends opposite the faces having the teeth are preferably reduced in diameter and threaded internally to receive a pipe-section 23, that, when the parts are assembled, projects through a central aperture in an appropriate cross-head 16 and thence extends toward the rear of the hanger-frame.

The steam and air pipes D E are of the usual construction and are hung from the car-frame, as shown in Fig. 1, being flexibly connected with the rear ends of the pipe-sections 23 by short pieces of hose F, and as the cross-heads 16 are loosely engaged with and supported by the housing-frame it will be evident that the rear ends of the pipe-sections may receive a limited degree of universal movement in and with the cross-heads through which they loosely pass.

The coupling-head sections 21 are each pressed forwardly by a spiral spring 24, said springs encircling the pipe-sections 23 and pressing at their ends against the head-sections and cross-heads 16.

As the coupling-head sections are self-adjustable the simple act of moving two cars toward each other sufficiently to shackle them together by the car-couplings will permit the coupling-head sections 21 to impinge their joint-rings on each other, while the interlocking engagement of the teeth $a$ on the faces of the coupling-head sections holds them aligned and interlocked. The pressure of the springs 24 forces the engaged head-sections into close contact, without regard to the position of the cars on the track, as the cross-heads 16 have sufficient play to permit the heads to preserve their sealed engagement, whether the cars are running on curves or traversing straight portions of the railroad.

If the cars that form a train are so far out of standard that the improved pipe-couplings will not properly couple together, the trainman can quickly, conveniently, and safely adjust the coupling-head sections for proper engagement by moving lever 19 as occasion may require.

As the pipe-couplings are not in any way clamped together, it will be apparent that the disconnection of cars, which have previously been coupled to produce a train, will simultaneously detach the pipe-couplings. Hence the improved pipe-couplings save time both while being connected and disconnected, and they afford reliable means for the junction of steam or air pipes on cars in an automatic manner, as before mentioned.

It will be evident that the number of pipes to be coupled may be decreased or increased within the scope of my improvements, and that the minor details of construction may be slightly changed without affecting the features of my invention. Hence I do not wish to limit the device to the precise details shown and described.

Having thus described my invention, I claim as new and desire to secure by Letters Patent—

1. The combination, with a car, of a depending support on same, two coupling-head sections, a pipe-section projecting from each coupling-head section, the said pipe and head sections being respectively arranged one above the other, two cross-heads vertically movable on the depending support and by which the pipe-sections are respectively held in connection with the cross-heads, and a lifting-lever, substantially as described.

2. The combination, with a car, of a depending support, two coupling-head sections having serrated front ends, two pipe-sections respectively connected to the coupling-head sections, two cross-heads movable in the support and with which the pipe-sections are connected and a lever adapted for lifting the cross-heads, substantially as described.

3. The combination with a car, of a depending and vertically-elongated support, two transversely-extending cross-heads movable in the support, a link connecting the cross-heads, means attached to the link for operating the cross-head, and a coupling-head section connected to each cross-head, substantially as described.

4. The combination of an elongated support, two cross-heads movable in said support, coupling-head sections respectively in connection with the cross-heads, and means for moving the cross-heads in the support and in unison with each other, substantially as described.

HARRISON REED.

Witnesses:
MOSES R. FRAZER,
CHARLES B. STEVENSON.